United States Patent [19]

Hauck et al.

[11] 3,856,818

[45] Dec. 24, 1974

[54] TRICYCLIC PHENOXY AMINOPROPANOLS

[75] Inventors: Frederic Peter Hauck, Somerville; Christopher Michael Cimarusti, Somerset, both of N.J.

[73] Assignee: E. R. Squibb & Sons, Inc., Princeton, N.J.

[22] Filed: July 3, 1972

[21] Appl. No.: 268,313

[52] U.S. Cl. ........ 260/340.5, 260/243 B, 260/247.1, 260/247.5 R, 260/247.7 R, 260/247.7 F, 260/268 H, 260/293.56, 260/293.57, 260/293.58, 260/293.59, 260/307 C, 260/309.6, 260/327 S, 260/343.6, 260/326.82, 260/326.9, 260/570.6, 424/282

[51] Int. Cl. ............................... C07d 13/10
[58] Field of Search ................................ 260/340.5

[56] References Cited
UNITED STATES PATENTS
3,239,520  3/1966  van Proosdij-Hartzema.... 260/340.5
3,459,782  8/1969  Koppe............................ 260/340.5

*Primary Examiner*—Richard J. Gallagher
*Assistant Examiner*—James H. Turnipseed
*Attorney, Agent, or Firm*—Lawrence S. Levinson; Merle J. Smith; Donald J. Barrack

[57] ABSTRACT

This invention relates to new cyclic polymethylene phenoxy-aminopropanols and related compounds of the formula

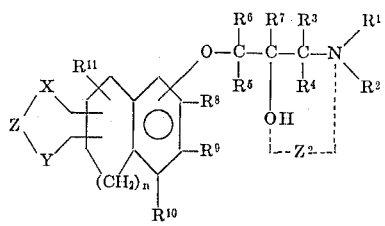

and to salts of such compounds, which are useful in coronary diseases, lowering blood pressure, as central nervous system depressants, water softening and corrosion inhibition.

6 Claims, No Drawings

TRICYCLIC PHENOXY AMINOPROPANOLS

This invention relates to new chemical compounds of the formula

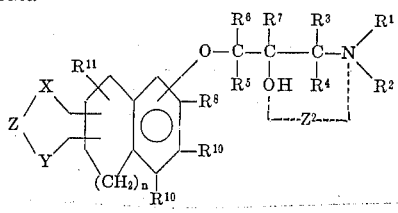

and salts thereof, wherein X—Z—Y together with two carbons of the cycloalkyl ring form a 5- to 7-membered ring, $R^3$, $R^4$, $R^5$, $R^6$ and $R^7$ are the same or different and can be hydrogen or lower alkyl, $R^8$, $R^9$ and $R^{10}$ are the same or different and can be hydrogen, lower alkyl, aralkyl, lower alkoxy, carboxy, monocyclic cycloalkyl, lower alkenyl, nitro, halogen, acyl, amino, acylamino, $R^{14}O(CH_2)_{n^1}$— where $R^{14}$ is hydrogen, lower alkyl or aralkyl and $n^1$ is 0 or 1; X and Y may be the same or different and can be —$CH_2$—, =N—, —O—, —S—, —$NR^{15}$—, —O—$CH_2$—, —S—$CH_2$—, or —$NR^{15}$—$CH_2$— where $R^{15}$ is hydrogen, lower alkyl or aryl, Z can be

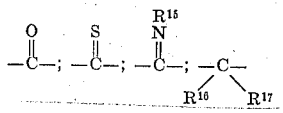

where $R^{16}$ and $R^{17}$ can be hydrogen, lower alkyl, cycloalkyl, aryl, haloalkyl, amino or aminoalkyl;

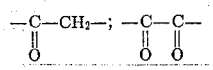

and —X—Z—Y— can be taken together to form

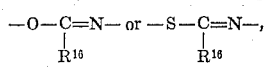

the radical

is a basic nitrogen containing radical of up to about 18 carbon, $R^{11}$ is hydrogen, lower alkyl or aralkyl and $n$ is 0, 1 or 2.

Where in Formula I the O—$Z^2$—N group is present, then, in such case, $R^2$ and the hydrogen attached to the oxygen will be deleted. Thus, the present invention includes compounds of the structures (II)

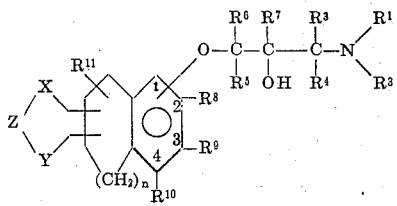

and (III)

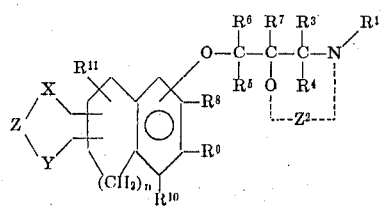

In Formulae I and III, $Z^2$ represents

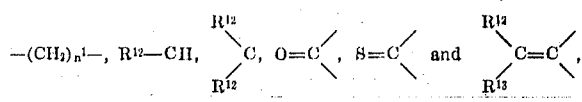

wherein $R^{12}$ and $R^{13}$ can be the same or different and can be hydrogen, lower alkyl, aryl, hydroxy, alkoxy, aryloxy or amino and $n^1$ is 1 or 2.

The term "lower alkyl" as employed herein includes both straight and branched chain radicals of up to and including eight carbon atoms, for instance, methyl, ethyl, propyl, isopropyl, butyl, s-butyl, t-butyl, isobutyl, pentyl, hexyl, isohexyl, heptyl, 4,4-dimethylpentyl, octyl, 2,2,4-trimethylpentyl and the like.

The aryl-lower alkyl groups include benzyl, phenethyl and the like.

The term "lower alkoxy" includes straight and branched chain radicals of the structure RO— wherein R includes any of the above lower alkyl groups.

The term "halogen" includes each of the four halogens, but Cl and Br are preferred.

The "amino" groups include unsubstituted amino or mono- or di-lower alkyl-amino groups, wherein lower alkyl is as defined above, such as amino, methyl amino, ethyl amino, isopropyl amino, heptylamino, dimethyl amino, diethyl amino, methyl ethyl amino, methyl butyl amino, ethyl i-propyl amino and the like.

The acyl radicals represented by R'' include lower fatty acid radicals such as acetyl, propionyl, butyryl, isobutyryl and the like, as well as long chain fatty acid radicals such as hexanoyl, heptanoyl, decanoyl, dodecanoyl and the like, monocyclic aryl and aralkanoic acid radicals such as benzoyl, phenacetyl and the like.

The term "lower alkenyl" refers to $C_3$ to $C_8$ aliphatic groups which include one double bond such as allyl and all isomers of propenyl, butenyl, pentenyl, hexenyl, heptenyl and octenyl.

The term "monocyclic aryl" as employed herein contemplates monocyclic carbocyclic aryl radicals, for instance, phenyl and substituted phenyl radicals, such as lower alkyl phenyl (e.g., o-, m- or p-tolyl, ethylphenyl, butylphenyl and the like, di(lower alkyl)phenyl (e.g., 2,4-dimethylphenyl, 3,5-diethylphenyl and the like) halophenyl (e.g., chlorophenyl, bromophenyl, iodophenyl, fluorophenyl), o-, m- or p-nitrophenyl, dinitrophenyl, (e.g., 3,5-dinitrophenyl, 2,6-dinitrophenyl and the like), and trinitrophenyl (e.g., picryl) and alkoxyphenyl such as methoxyphenyl.

The terms "monocyclic cycloalkyl" includes cyclic radicals containing from 3 to 6 ring members (e.g., cyclopropyl, cyclobutyl, cyclopentyl and cyclohexyl).

In the basic nitrogen containing radical

in formula I, $R^1$ and $R^2$ each represents hydrogen, lower alkyl, lower alkenyl, hydroxy-lower alkyl and phenyl-lower alkyl forming such basic groups as amino, lower alkylamino, e.g., methylamino, ethylamino, isopropylamino, di(lower alkyl)amino, e.g., dimethylamino, diethylamino, dipropylamino, lower alkenylamino, e.g., allylamino, di(lower alkenyl)amino, e.g., diallylamino, (hydroxy-lower alkyl)amino, e.g., hydroxyethylamino, di(hydroxy-lower alkyl)amino, e.g., di(hydroxyethyl)amino, phenyl(lower alkyl)amino, e.g., benzylamino, phenethylamino, N-(lower alkyl)phenyl(lower alkyl)amino, e.g., N-methylbenzylamino, and the like.

The

radical may form a heterocyclic radical. The symbols R¹ and R² may together represent the carbon (and hydrogen) and the oxygen, sulfur or nitrogen atoms which, with the nitrogen or carbon atom in the above group, form a 5- or 6-membered nitrogen heterocyclic containing not more than one hetero atom in addition to the nitrogen already shown in the group and less than 21 atoms in the radical (excluding hydrogen). The heterocyclic radicals may include one to three substituents including lower alkoxy or lower alkyl as defined hereinbefore; trifluoromethoxy; trifluoromethylmercapto; N,N-dialkylsulfamoyl groups, such as N,N-dimethylsulfamoyl; lower alkanoyl groups

where R is lower alkyl) as defined hereinbefore, such as acetyl, propionyl, and the like; hydroxy-lower alkyl, such as hydroxymethyl, 2-hydroxyethyl or the like; hydroxy-lower alkoxy-lower alkyl, such as 2-(2-hydroxyethoxy)ethyl, or the like; lower alkanoyl-lower alkyl, such as 2-heptanoyloxyethyl; carbolower alkoxy, such as carbomethoxy, carboethoxy, carbopropoxy, or the like; or 2-(lower alkanoyloxy-lower alkoxy)lower alkyl such as 2-(decanoyloxyethoxy)ethyl, or the like.

Illustrative of the heterocyclic radicals represented by

are the following: piperidino; (lower alkyl)piperidino [e.g., 2-, 3-, or 4-(lower alkyl)piperidino or 4-(N-lower alkyl)-piperidino, such as 2-(ethyl)piperidino or 4-(N-isopropyl)-piperidino]; di(lower alkyl)piperidino [e.g., 2,4-, 2,5- or 3,5-di(lower alkyl)piperidino, such as 2,4-dimethyl piperidino or 2,5-di-t-butyl piperidino]; (lower alkoxy)piperidino [e.g., 2-methoxypiperidino or 3-methoxypiperidino]; hydroxypiperidino [e.g., 3-hydroxy- or 4-hydroxypiperidino]; aminomethylpiperidino [e.g., 4-aminomethylpiperidino]; pyrrolidino; (lower alkyl)pyrrolidino [e.g., 3-methylpyrrolidino]; di(lower alkyl)pyrrolidino [e.g., 3,4-dimethylpyrrolidino]; (lower alkoxy)pyrrolidino [e.g., 2-methoxypyrrolidino]; morpholino; (lower alkyl)morpholino [e.g., 3-methylmorpholino]; di(lower alkyl)morpholino, [e.g., 3,5-dimethylmorpholino]; (lower alkoxy)-morpholino, [e.g., 2-methoxymorpholino]; thiamorpholino; (lower alkyl)-thiamorpholino [e.g., 3-methylthiamorpholino]; di(-lower alkyl)thiamorpholino, [e.g., 3,5-dimethylthiamorpholino], (lower alkoxy)thiamorpholino, [e.g., 3-methoxythiamorpholino]; piperazino; (lower alkyl)piperazino, [e.g., N⁴-methylpiperazino]; di(lower alkyl)piperazino, [e.g., 2,5-dimethylpiperazino or 2,6-dimethylpiperazino]; (lower alkoxy)piperazino,[e.g., 2-methoxypiperazino]; (hydroxy-lower alkyl)piperazino, [e.g., N⁴-(2-hydroxyethyl)piperazino]; (lower alkanoyloxy-lower alkyl)-piperazino, [e.g., N⁴-(2-heptanoyloxyethyl)-piperazino or N⁴-(2-propionyloxyethyl)piperazino]; (hydroxy-lower alkoxylower alkyl)piperazino, [e.g., (hydroxymethoxymethyl)piperazino]; (carbo-lower alkoxy)piperazino, [e.g., N⁴-(carbomethoxy-, carboethoxy-, or carbopropoxy)piperazino]; piperidyl; (lower alkyl)piperidyl [e.g., 1-, 2-, 3- or 4-(lower alkyl)-piperidyl, such as 1-N-methylpiperidyl or 3-ethylpiperidyl]; di(lower alkyl)piperidyl, [e.g., 2,4-, 2,5, or 3,5-di(lower alkyl)-piperidyl wherein lower alkyl is methyl, ethyl, n-propyl, isopropyl, etc.]; lower alkoxy piperidyl, [e.g., 3-methoxypiperidyl or 2-ethoxypiperidyl]; hydroxypiperidyl [e.g., 3-hydroxy- or 4-hydroxypiperidyl]; aminomethylpiperidyl,[e. g. 4,-aminoethylpiperidyl]; pyrrolidyl, lower alkyl pyrrolidyl, [e.g., 1-N-methylpyrrolidyl]; di(lower alkyl)pyrrolidyl, [e.g., 2,3-dimethylpyrrolidyl]; lower alkoxy pyrrolidyl, [e.g, 4-N-methoxypyrrolidyl]; morpholinyl; (lower alkyl)-morpholinyl, [e.g., 3-methylmorpholinyl]; di-(lower alkyl)-morpholinyl, [e.g., 3-methyl-4-N-ethylmorpholinyl]; (lower alkoxy)-morpholinyl, [e.g, 2-ethoxymorpholinyl]; thiamorpholinyl; (lower alkyl)thiamorpholino, [e.g., 3-ethylthiamorpholinyl]; di(lower alkyl)thiamorpholinyl, [e.g., 3-methyl-4-N-ethylthiamorpholinyl]; lower alkoxy thiamorpholino, [e.g., 3-methoxythiamorpholinyl]; piperazinyl; alkyl, dialkyl, alkoxy or hydroxy-lower alkyl substituted piperazinyl.

The compounds of formula I form acid addition salts with inorganic and organic acids. These acid addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydrohalides, especially the hydrochloride and hydrobromide which are preferred, sulfate, nitrate, phosphate, borate, acetate, oxalate, tartrate, maleate, citrate, succinate, benzoate, ascorbate, salicylate, methanesulfonate, benzenesulfonate, toluenesulfonate and the like. Quaternary ammonium salts are also formed, e.g., by reacting the free base with an alkylating agent, e.g., lower alkyl halide such as methyl chloride, ethyl bromide or the like, lower alkyl sulfate such as methyl sulfate, aralkyl halides such as benzyl chloride, aralkyl sulfates such as benzyl sulfate and the like.

Preferred are those compounds wherein R³, R⁴, R⁵, R⁶, R⁷, R⁸, R⁹, R¹⁰ and R¹¹ are all hydrogen, R¹ is hydrogen or lower alkyl especially hydrogen, R² is lower alkyl, especially isopropyl, and X is O, Y is O and Z is

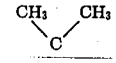

and the aminopropanol $C_{chain\ is\ at\ the}$ 1- or α-position.

In all of the above embodiments of the invention, the X-Z-Y group will be attached to the cycloalkyl ring on two vicinal carbon atoms.

The new compounds of this invention are useful as water softeners and for inhibiting the corrosivity of engine lubricants.

They are also useful as central nervous system depressants and antifibrillatory agents, for example, in arresting cardiac arrhythmia in mammals, e.g., by inhibition of beta adrenergic receptors in the myocardium. For these purposes a compound of formula I or a physiologically acceptable acid addition salt may be incorporated in a conventional dosage form such as tablet, capsule, elixir, injectable or the like along with the necessary carrier material, excipient, lubricant, buffer or the like. Single or divided doses of about 5 to 25 mg/kg/day, preferably about 4 to 10 mg/kg, two to four times daily may be administered in dosage forms as described above.

Compounds of formula I can be prepared by reacting a phenol of the structure
(IV)

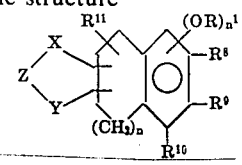

with an alkali metal alkoxide such as NaOCH₃ in an alcohol solvent boiling below about 100°, such as methanol, and removing the solvent in vacuo to give the dry salt which is reacted with an epoxide of formula V, (V) 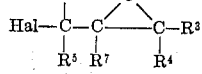

(Hal is chlorine or bromine), such as epichlorohydrin in a solvent such as dimethylsulfoxide (as described herein) to form 1,2,3,4-tetrahydro-5-[2,3-epoxy propoxy]-naphthalenes of the structure VI 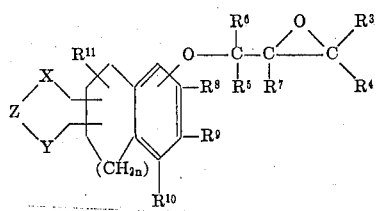

The above epoxy-propoxy-naphthalene can be converted to the formula I compounds of the invention by heating with an amine VII 

in an inert organic solvent, such as n-propanol, benzene or toluene, e.g., for about 16 to 24 hours; the reactants may also be heated in a Parr pressure reactor at a temperature within the range of from about 70 to about 110° for 6 – 12.

Compounds of formulae I and III wherein Z² is present, that is

III 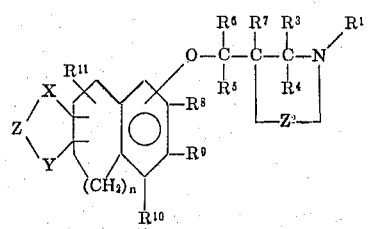

where Z² is

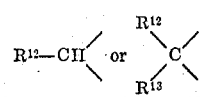

can be prepared by reacting a compound of formula II, that is

II 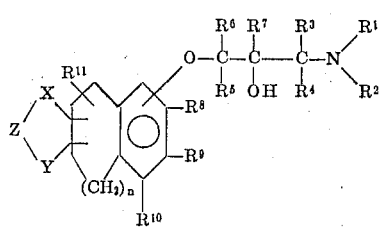

with a ketone or an aldehyde of the structure

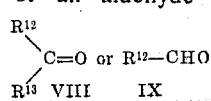

wherein R¹² and R¹³ are the same or different and can be lower alkyl, monocyclic aryl or lower alkyl-monocyclic aryl in the presence of a solvent boiling below about 100°C., such as benzene or chloroform to form an oxazolidine compound of the structure

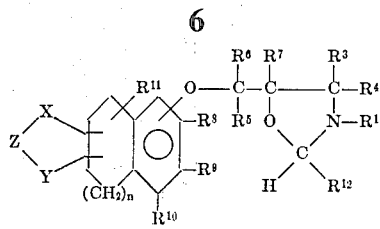

Compounds of formula III wherein Z² is $$O=C< \text{ or } S=C<$$

can be prepared by reacting compounds of formula II with phosgene (COCl₂) or thiophosgene (CSCl₂) to form compounds of the structure XI 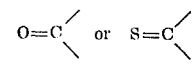

where Z³ is O or S.

Alternatively, compounds of structure I can be prepared by reacting a starting material of structure IV with a compound of the structure XII XII 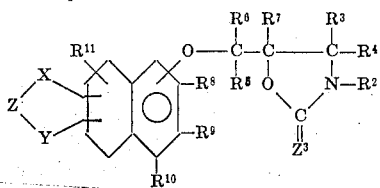

to form ethers of the structure

XIII 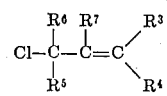

which are epoxidized by reaction with a suitable oxidizing agent such as m-chloroperbenzoic acid or other peracid in a solvent such as chloroform, to compounds of structure VI. This method is particularly useful where R³, R⁴, and/or R⁷ are other than hydrogen and R⁵ and R⁶ are hydrogen.

The cyclic polymethylene phenols of structure IV employed as starting materials herein are disclosed in copending application Ser. No. 268,300, filed July 3, 1972 entitled TRICYCLIC TETRAHYDRO NAPHTHALENEOLS AND RELATED COMPOUNDS.

Preferred compounds of the invention include those having the structure

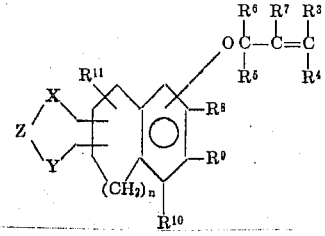

It will be appreciated that compounds of the invention wherein the aminopropanol group is in the 2-position or β-position may be prepared as described hereinbefore with respect to the compounds of the invention wherein the aminopropanol is in the 1- or α-position, employing as starting materials, compounds where OR is in the 2-or β-position.

The following examples further illustrate and represent preferred embodiments of the invention.

EXAMPLE 1

3a,9a-cis-1-(tert-Butylamino)-3-[(3a, 4,9,9a-tetrahydro-2, 2-dimethyl-2H-naphtho[2,3-d]dioxol-5-yl)-oxy]-2-propanol A. cis-5,6,7,8-Tetrahydro-1,6,7-naphthalenetriol A solution of 29.2 g. (0.2 mole) of 5,8-dihydro-1-naphthol and 40 ml. of acetic anhydride in 100 ml of pyridine is prepared. After 16 hr. the solvent is removed in vacuo and the residue dissolved in ether and washed with 200 ml. of 5% hydrochloric acid, water, 200 ml. of 10% sodium hydroxide, saturated salt solution and dried. Solvent removal gives 34.2 g (90.5) of crude acetate which is dissolved in 900 ml. of acetic acid and 36 ml. of water. 53.3 g. (0.32 mole) of silver acetate is added followed by 40.6 g. (0.16 g-atom) of iodine. The slurry is heated with good stirring at 85±10° for 3 hr. under nitrogen, cooled and filtered. The filtrate is evaporated in vacuo and the residue dissolved in 250 ml. of methanol and cooled to 0°. A solution of 40 g. of sodium hydroxide in 200 ml. of water is added under nitrogen and the mixture stirred overnight. The bulk of the methanol is removed in vacuo whereupon a solid forms. The solid is separated by filtration, dissolved in 150 ml. of water and acidified with 20 ml. of concentrated hydrochloric acid. Cooling gives a solid which is filtered and dried to give 16.5 g. 2,3 cis-5,6,7,8-tetrahydro-1,6,7-naphthalenetriol m.p. 184.5°–187°. Three recrystallizations from absolute ethanol give the analytical sample, m.p. 188°–188.5°.

Anal. Calc'd for $C_{10}H_{12}O_3$: c, 66.65; H, 6,71
Found: C, 66.19; H, 6.68

B. Acetonide of cis-5,6,7,8-tetrahydro-1,6,7-naphthalenetriol

A slurry of 5.4 g of the cis-5,6,7,8-tetrahydro-1,6,7-naphthalene-triol in 50 ml of 2,2-dimethoxy propane is treated with 150 mg. of TsOH (solution in 10 min). After 1 hr. the solution is partitioned between ether and sat'd bicarbonate solution. The organic layer is dried and evaporated to give 6.58 g. essentially TLC homogeneous. Crystallization of a small sample from hexane/ethyl acetate gives the title material of mp. 130.5°–131.5°.

C. Acetonide of 3-(5,6,7,8-tetrahydro-cis-6,7-dihydroxynaphthoxy)-1,2-epoxypropane A solution of 5.8 g (0.026 mole) of the above phenol and 1.51 g (0.028 mole) of sodium methoxide is prepared in 100 ml of methanol and the solvent removed in vacuo. The residue is dissolved in 75 ml of DMSO, ca. 15 ml distilled out (40° at 0.2 mm) and 4 ml of epichlorohydrin added. After stirring overnight at room temperature under nitrogen the solution is poured into 1.2 liters of water and extracted with ether (2 × 250 ml). The ether is washed twice with water, dried and evaporated to give 7.2 g of tan oil of the above title.

D. 3a,9a-cis-1-(tert-Butylamino)-3-[(3a, 4,9,9a-tetrahydro-2,2-dimethyl-2H-naphtho[2,3-d]dioxol-5-yl)-oxyl]-2-propanol The above epoxide is heated at 80 ± 5° in the small Parr bomb with 45 ml of t-butyl amine for 16 hours. The excess amine is removed in vacuo and the residue crystallized from a mixture of hexane and ether to give 3.3 g. Recrystallization from 100 ml of 10–15% ether in pentane gives 1.5 g, mp 85°–88°.

Anal. Calcd for $C_{20}H_{31}$. $NO_4$: C, 68.74; H, 8.94; N, 4.01.
Found: C, 68.71; H, 9.06; N, 3.79.

EXAMPLE 2

3a,9a-cis-1-(tert-Butylamino)-3[(3a,4,9,9a-tetrahydro-2-propyl-2H-naphtho[2,3d]dioxol-5-yl)-oxy]-2-propanol A. $O^6,O^7$-Butylidene-5,6,7,8-tetrahydro-1,6,7-naphthalenetriol A solution of 3.6 g (0.02 moles) of the triol of Example 1-A in 50 ml. of benzene, and 1.5 of butanal in the presence of 0.1 g p-toluene sulfonic acid are mixed together and stirred for several hrs. Water is removed by azeotropic distillation and the residue is taken to dryness to yield the title compound.

B. 3a,9a-cis-1-(tert-Butylamino)-3[(3a,4,9,9a-tetrahydro-2-propyl-2H-naphtho[2,3d]dioxol-5-yl)-oxy]-2-propanol The procedure of Example 1C and D is followed in employing the triol of part A to form the title compound.

EXAMPLE 3

3a,9a-cis-1-(tert-Butylamino)-3[(3a,4,9,9a-tetrahydro-2-diethylaminomethyl)-2H-naphtho[2,3d]dioxol-5yl)-oxy]-2-propanol A. 6,7-β-chloroethylidene-5,6,7,8-tetrahydro-1,6,7-naphthalenetriol A solution of 27 g (0.15 moles) of cis-5,6,7,8-tetrahydro-1,6,7-naphthalenetriol prepared as described in Example 1 in 250 ml of benzene and 25 g of diethoxyethyl chloride in the presence of 0.2 g p-toluene sulfonic acid are mixed together for several hours. Water is removed by azeotropic distillation and the residue taken to dryness to yield the title comound.

B. $O^6$, $O^7$-β-Diethylaminoethylidene-5,6,7,8-tetrahydro-1,6,7-naphthalenetriol The procedure described in J. Pharm and Pharmac. 23, 649 (1971) is followed.

The haloacetal from part A is dissolved in ethanol containing excess diethylamine and the mixture heated at 100°C for 48 hours in a bomb. The mixture is cooled and water and solvent stripped therefrom. The residue is purified by chromatography on Alumina II neutral to yield the title compound.

C. 3a,9a-cis-1-(tert-Butylamino)-3[(3a,4,9,9a-tetrahydro-2-diethylaminomethyl)-2H-naphtho[2,3d]dioxol-5-yl)-oxy]-2-propanol The procedure of Example 1C and D is followed employing the triol of part B to form the title compound.

EXAMPLE 4

3a,9a-cis-1-(iso-Propylamino)-3-[3a,4,9,9a-tetrahydro-2H-naphtho[2,3d]dioxol-2-one-5yl]-oxy]-2-propanol A. 5,8-Dihydro-1-naphthol, benzyl ether A solution of 5,8-dihydro-1-naphthol (73 g., 0.5 M) in 400 ml. DMSO is treated with 0.5 M of sodium methoxide. The mixture is cooled in an ice bath while benzyl bromide (85.5 g., 0.5 M) is added dropwise. The mixture has to be shaken periodically since there is difficulty in stirring. Toward the end of the addition the mixture is allowed to warm to ~45°, and stirring is continued for 2–3 hours after addition is complete. The mixture is then poured into 1 liter $H_2O$ and the product is extracted into ether. The ether extracts are washed with 10% NaOH, dried and the solvent is removed in vacuo to give a quantitative yield of crude crystalline product.

A small sample (4g.) of this is recrystallized twice from methanol to give the title compound, 1.3 g., mp 70°–74°.

Anal. Calc'd for $C_{17}H_{16}O$: C, 86.40: H, 6.83
Found: C, 86.58; H, 6.6

B. cis-5,6,7,8-tetrahydro-1,6,7-naphthalenetriol-O'-benzyl ether

To 47.2 g (0.20 mole) of the above ether dissolved in 900 ml of acetic acid containing 30 ml of water is added 53.3 g (0.32 mole) of silver acetate with vigorous stirring followed by 40.6 g (0.16 g. atom) of iodine. After 1 hour, the slurry is heated to 85°–95° for 3 hours under nitrogen, cooled and filtered. The filtrate is taken to dryness in vacuo and the residue taken up in 250 ml of methanol and treated in the cold with a solution of 40 g of sodium hydroxide in 200 ml of water. After stirring overnight, the bulk of the methanol is removed in vacuum, and the product extracted into chloroform. After drying and solvent removal, the product is induced to crystallize by trituration with hexane.

C. 5,6,7,8-Tetrahydro-1,6,7-naphthalenetriol-O'-benzyl ether-$O^6$,$O^7$-carbonate In accordance with the procedure set out in *Arch. Pharm.* 304 590 (1971), a solution of 27 g (0.1 mole) of the diol of part B (0.1 m) in 200 ml of THF is treated with 1.7 g (0.1 m) of N,N-carbonyl diimidazole and heated under reflux for 2 hours. After cooling, the mixture is poured into water and the product extracted into $CHCl_3$, dried and purified on deactivated silica gel to give the title compound.

D. 3a,9a-cis-1-(iso-Propylamino)-3-[3a,4,9,9a-tetrahydro-2H-naphtho[2,3d]dioxol-2-one-5yl]-oxy]-2-propanol The procedure of Example 1C and D (substituting isopropylamine for t-butylamine) is followed employing the above carbonate to form the title compound.

EXAMPLE 5

3a,9a-cis-1-(iso-Propylamino)-3-[3a,4,9,9a-tetrahydro-2-ethyl-2-methyl-2H-naphtho[2,3d]dioxol-6yl)-oxyl]-2propanol A. 5,8Dihydro-2-naphthol The procedure of Marshall, et al., Can. J. Chem., 47. 3127 (1969) is followed exactly. From 25.0 g of β-naphthol is obtained 18.9 g of crude product. NMR analysis indicated it to contain ca. 40% of the desired 5,8-dihydro-2-naphthol an 60% of 5,6,7,8-tetrahydro-2-naphthol.

B. cis-5,6,7,8-Tetrahydro-2,6,7-naphthalene triol

The 18.9 g. of crude product was converted to the acetate by the procedure used in Example 1 and the resulting oil (23.8 g) was heated at 90° for 3 hr. with 300 ml. of acetic acid, 20 ml. of water, 23.5 g. of silver acetate and 18.0 g. of iodine. The slurry was cooled and filtered. The filtrate was evaporated and the residue stirred overnight under nitrogen with 100 ml. each of water and methanol and 20 g. of sodium hydroxide. The methanol was removed in vacuo and the residue acidified at 0° with 155 ml. of 122 hydrochloric acid. The oil which separated crystallized when shaken in a separatory funnel with chloroform. Filtration gave 7.9 g. of tan solid. Recrystallization from ethanol/ethyl acetate gave in several crops 4.03 g., mp 193°–195.5°.

C. $O^6$, $O^7$-2'-Butylidene-5,6,7,8-tetrahydro-2,6,7-naphthalenetriol

Following the procedure of Example 2 substituting for butanal, methyl ethyl ketone, the title compound is obtained.

D. 3a,9a-cis-1-(iso-Propylamino)-3-[3a,4,9,9a-tetrahydro-2-ethyl-2-methyl-2H-naphtho[2,3d]dioxol-6yl)-oxy]-2-propanol The procedure of Example 4D is followed employing the above triol to form the title compound.

EXAMPLE 6

3a,9a-trans-1-(tert-Butylamino)3-[3a,4,9,9a-tetrahydro-2,2-dimethyl-2H-naphtho[2,3d]-1-thia-3-oxol-5(and 8)-oxy]2-propanol A. 6,7-Epoxy-5,6,7,8-tetrahydro-1-naphthyl benzyl ether A solution of 73 g. (0.5 m) of 5,8-dihydro-1-naphthol in 100 ml. DMSO is treated with 0.5 m sodium methoxide. The mixture is cooled in an ice bath and treated dropwise with 0.5 mole benzyl bromide with shaking periodically. The mixture is gradually allowed to warm up to about 45° toward the end of addition. The mixture is stirred 3 hrs. longer, then poured into 1 liter $H_2O$ and extracted into ether. Extracts are washed twice with 10% NaOH, dried, taken to dryness leaving almost a quantitative yield of crystalline 5,8-dihydro-1-naphthyl benzyl ether.

A solution of 23.6 g. (0.10 m) of the above ether in 250 ml. $CHCl_3$ is treated with a solution of 0.11 m m-chloroperbenzoic acid in $CHCl_3$ at 10°–15°C and stirred overnight. After filtration, the organic filtrate is washed with dilute $K_2CO_3$, dried and freed of solvent, leaving crude solid epoxy ether.

B. 7(and 6)Mercapto-5,6,7,8-tetrahydronaphthalene-1,6,(and 7)diol

A solution of the above epoxyether (12.6 g. 0.05 m) in ethanol was added to an aqueous solution of sodium sulfide and the resulting mixture warmed for serveral hours. After cooling and acidification with acetic acid, the product was extracted into $CHCl_3$, dried and freed of solvent to leave a mixture of isomeric mercapto alcohols of structure:

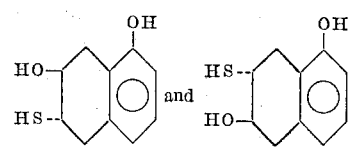

C. Acetonide of 7(and 6)mercapto-5,6,7,8-tetrahydronaphthalene-1,6(and 7)diol

In a manner similar to Example 1B, substituting the above mercapto compounds from part E for the triol, the title acetonide is obtained.

d. 3a,9a-trans-11(tert-Butylamino)-3-[3a,4,9,9a-tetrahydro-2,2-dimethyl-2H-naphtho[2,3d]-1-thia-3-oxol-5(and 8)-oxy]-2-propanol The procedure of Example 1C and D is followed employing the above acetonide to form the title compound.

EXAMPLE 7

3a,9a-trans-1-(iso-Propylamino)-3[3a,4,9,9a-tetrahydro-2-butyl-2-methyl-2H-naphtho[2,3d]-1-thia-3-oxol-5(and 8)yl)oxy]-2-propanol A. S,$O^7$-2'-Hexylidene-6-mercapto-5,6,7,8-tetrahydronaphthalene-1,7-diol Employing the mercaptan prepared in Example 6B in lieu of the 1,2,3,4-tetrahydro-1,2,5-naphthalenetriol in the procedure of Example 2, and replacing the butanal with methyl butyl ketone, the following compound is obtained

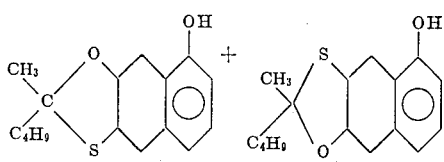

B. 3a,9a-trans-1-(iso-propylamino)-3[3a,4,9,9a-tetrahydro-2-butyl-2-methyl-2H-naphtho[2,3d]-1-thia-3oxol-5(and 8)oxy]-2-propanol The procedure of Example 1C and D is followed employing the above diol to form the title compound.

EXAMPLE 8

3a,9a-trans-1-(iso-Propylamino)-3[3a,4,9,9a-tetrahydro-2-diethylaminomethyl-2H-naphtho[2,3d]-1-thia-3-oxol-5(and 8)yl)-oxy]-2-propanol A. S,O⁷-β-Chloroethylidene-6-mercapto-5,6,7,8-tetrahydronaphthalene-1,7-diol Employing the mercaptan prepared in Example 6B in lieu of cis-5,6,7,8-tetrahydro-1,6,7-naphthalenetriol in the procedure of Example 3, the following compound is obtained

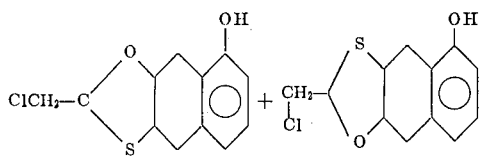

B. 3a,9a-trans-1-(iso-Propylamino)-3[3a,4,9,9a-tetrahydro-2-diethylaminomethyl 2H-naphtho[2,3d]-1-thia-3-oxol-5(and 8)-yl)-oxy]-2-propanol The procedure of Example 4D is followed by employing the above diol to form the title compound.

EXAMPLE 9

3a,9a-trans-1-(iso-Propylamino)-3[3a,4,9,9a-tetrahydro-2H-naphtho[2,3d]-1-thia-3-oxol-2-one-5(and 8)-yl)oxy]-2-propanol A. 6-Mercapto-5,6,7,8-tetrahydronaphthalene-1,7-diol S,O⁷-carbonate-O'-benzyl ether Employing the benzyl ether of the mercaptan of Example 6B in the procedure of Example 4 in lieu of the diol, the following compound is obtained

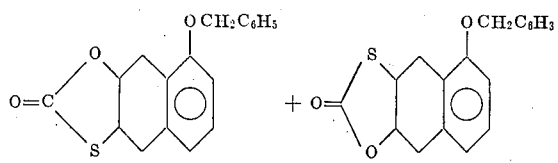

B. 3a,9a-trans-1-(iso-Propylamino)-3[3a,4,9,9a-tetrahydro-2H-naphtho[2,3d]-1-thia-3-oxol-2-one-5(and 8)-yl)oxy]-2-propanol The above compound is debenzylated by reaction with Pd/C in the presence of pyridine and the resulting diol is subjected to the procedure of Example 1C and D to form the title compound.

EXAMPLE 10

7-Hydroxy-1(and 4)-(2'-hydroxy-3'-tert butylamino propoxy)-5,6,7,8-tetrahydro-6-naphthyloxyacetic acid lactone A. 7(and 6)Hydroxy-5,6,7,8-tetrahydro-6(and 7)-naphthyloxyacetic-acid lactone The above compound is prepared by reacting 0.1 mole 5,6,7,8-tetrahydro-1,6,7-naphthalenetriol O'-benzyl ether with 0.1 mole of Cl—CH₂CO₂C₂H₅ in 100 ml of dimethoxyethane in the presence of 3 g NaH and heating the mixture at reflux for several hours and thereafter separating the product from the reaction mixture by chromatography on silica gel.

Catalytic debenzylation over 5% Pd/c in ethanol then affords the free phenol.

B. 7-Hydroxy-1(and 4)-(2'-hydroxy-3'-tert butylamino propoxy)-5,6,7,8-tetrahydro-6-naphthyloxyacetic acid lactone The procedure of Example 1C and D is followed employing the above phenol to form the title compound.

EXAMPLE 11

6,7-cis-1-(tert-Butylamino)-3-(6,7-dihydroxy-5,6,7,8-tetrahydronaphthyloxy)-2-propanol O⁶,O⁷ cyclic oxalate-O'-benzyl ether.

A. 5,6,7,8-Tetrahydronaphthalene-1,6,7-triol O⁶,O⁷ cyclic oxalate-O'-benzyl ether.

The above compound is prepared by dissolving 0.1 m of 5,6,7,8-tetrahydro-1,6,7-naphthalenetriol O'-benzyl ether in 25 ml of cold pyridine and adding 0.1 m of oxalyl chloride dropwise. After filtration and solvent removal, the product is purified by chromatography on silica gel. Catalytic debenzylation over 5% Pd and C then yields the free phenol.

6,7-cis-1-(tert-Butylamino)-3-(6,7-dihydroxy-5,6,7,8-tetrahydronaphthyloxy-2-propanol O⁶,O⁷ cyclic oxalate-O'-benzyl ether.

The procedure of Example 1C and D is followed employing the above phenol to form the title compound.

EXAMPLE 12

3a,9a-trans-1-(iso-Propylamino)-3[(3a,4,9,9a-tetrahydro-2H-naphtho[2,3d]-1-thia-3-oxol-2-thion-5(and 8)yl)oxy]-2-propanol A. 6-Mercapto-5,6,7,8-tetrahydro-naphthalene-1,7-diol-O'-benzyl ether O⁷,S-thiocarbonate The procedure of Examples 9 and 4 are followed employing the benzyl ether of the mercaptan of Example 6B and thiophosgene in place of phosgene to form the above compound.

B. 3a,9a-trans-1-(iso-Propylamino)-3[(3a,4,9,9a-tetrahydro-2H-naphtho[2,3d]1-thia-3-oxol-2-thion-5(and 8)yl)oxy]-2-propanol Catalytic debenzylation of the benzyl ether over 5% Pd on C in the presence of ethanol yields the free phenol. The free phenol is subjected to the procedure of Example 4D to form the title compound.

EXAMPLE 13

3a,9a-trans-1-(tert-Butylamino)-3[93a,4,9,9a-tetrahydro-2H-naphtho[2,3d]-1-oxy-3-azol-2-one-5(and 8)yl)oxy]-2-propanol A. 6(and 7)-Amino-5,6,7,8-tetrahydronaphthalene-1,7-(and 6)-diol-O'-benzyl ether O⁷, N-carbonate A solution of 0.1 m each of the epoxide benzyl ether of Example 6A and phenyl isocyanate in xylene is added to a solution containing 0.004 m of tributyl phosphine oxide and 0.003 m of lithium bromide in xylene and the mixture heated under reflux overnight. After cooling, solvent is removed and the crude mixture of products purified on neutral Alumina III to give the title compound.

Method Ref. *Tet. Letters* 809 (1971)

B. 3a,9a-trans-1-(tert-Butylamino)-3[(3a,4,9,9a- tetrahydro-2H-naphtho[2,3d]-1-oxy-3-azol-2-one-5(and 8)yl)oxy]2-propanol

Catalytic debenzylation of the benzyl ether over 5% Pd on C in the presence of ethanol yields the free phenol. The free phenol is subjected to the procedure of Example 1C and D to form the title compound.

EXAMPLE 14

3a,9a-trans-1-(tert-Butylamino)-3[3a,9,9a-tetrahydro-2H-naphtho [2,3d]-1-oxa-3-azol-2-thion-5-(and 8)yl)-oxy]-2-propanol A. 6-Amino-5,6,7,8-tetrahydronaphthalene -1,7-diol-O'-benzyl ether $O^7$,N-thiocarbonate A solution of 0.1 m each of the epoxide benzyl ether of Example 6A and butylisothiocyanate in xylene added to a solution containing 0.004 m of tributyl phosphine oxide and 0.003 m of lithium bromide in xylene and the mixture heated under reflux overnight. After cooling, solvent is removed and the crude mixture of products purified on neutral Alumina III to give the title compound.

Method Ref. *Tet. Letters* 809 (1971).

B. 3a,9a-trans-1-(tert-Butylamino)-3[3a,4,9,9a-tetrahydro-2H-naphtho[2,3d]-1-oxa-3-azol-2-thion-5(and 8)yl)-oxy]-2-propanol Catalytic debenzylation of the above benzyl ether over 5% Pd and C in the presence of ethanol yields the free phenol. The free phenol is subjected to the procedure of Example 1C and D to yield the title compound.

EXAMPLE 15

3a,9a-cis-1-(tert-Butylamino)-3[3a,4,9,9a-tetrahydro-2-phenyl-1H-naphth[2,3d]oxazol-5(and 8)yl)oxy]-2-propanol A. 6,7-Epoxy-5,6,7,8-tetrahydro-1-naphthol benzyl ether A solution of 12.8 (0.054 m) of 5,7-dihydro-1-naphthol benzyl ether in 150 ml of $CH_2Cl_2$ was cooled to 0° and 8.9 g 0.052 mole of m-chloroperbenzoic acid was added over a period of 5 min. and the mixture was stirred overnight at room temperature.

The suspension was poured into a mixture of 50 ml of 10% NaOH and 100 g of ice. The aqueous layer was extracted with $CH_2Cl_2$, and the combined organic layers were washed with water and satd. NaCl soln, dried and evaporated in vacuo to give the title compound.

B. trans 6(and 7)-Amino-5,6,7,8-tetrahydro-1-1,7(and 6)-naphthalenediol

A solution of 6,7-epoxy-5,6,7,8-tetrahydro-1-naphthol O'-benzyl ether 12.6 g (0.05 mole) in 200 ml dioxane was heated to 40° and a solution of sodium azide (6,8 g, 0.11 mole) in water (20 ml) was added dropwise. The mixture was heated under reflux overnight, cooled, filtered and the solvent was removed in vacuo.

The crude azide was dissolved in 100 ml of ether and added to a suspension of LAH (5 g) in 250 ml of ether. After several hours at reflux, the mixture was decomposed with aqueous potassium carbonate and the filtrate freed of solvent.

C. C-Phenylimidazole derivative of 6-amino-5,6,7,8-tetrahydronaphthalene-1,7-diol O'-benzyl ether The trans amino alcohol was converted to its N-benzoyl derivative with benzoyl chloride-pyridine. This is added portionwise to excess thionyl chloride and then kept at 50°–60° for 3 hrs. Removal of excess reagent in vacuum leaves the crude cis oxazoline as its HCl salt, which is recrystallized from ethanol-ether.

D. 3a,9a-cis-1-(tert-Butylamino)-3[3a,4,9,9a-tetrahydro-2-phenyl-1H-naphth[2,3d]oxazol-5(and 8)yl)oxy]-2-propanol Catalytic debenzylation of the above benzyl ether over 5% Pd/C in the presence of ethanol yields the free phenol which is converted to the title compound by the procedure of Example 1C and D.

EXAMPLE 16

1-(tert-Butylamino)-3[3a,4,9,9a-tetrahydro-2-amino-1-H-naphth-[2,3d]oxazol-5(and 8)yl)oxy]-2propanol A. Aminooxazoline derivative of 6(and 7)amino-5,6,7,8-tetrahydronaphthalene-1,7(and 6)diol An intimate mixture of 12.6 g (0.05 mole) of 6,7-epoxy-5,6,7,8-tetrahydro-1-naphthyl benzyl ether and 25 g of guanidine are heated to 140°–180°C until gas evolution ceases. The reaction mixture is cooled, and the product recrystallized from alcohol.

B. 1-(tert-Butylamino)-3[3a,4,9,9a-tetrahydro-2-amino-1-H-naphth[2,3d]oxazol-5(and 8)yl)oxy]-2-propanol The free phenol obtained on catalytic debenzylation is subjected to the procedure of Example 4D to form the title compound.

EXAMPLE 17

6-Hydroxy-5(and 8)-(2-hydroxy-3-butylaminopropoxy)-5,6,7,8-tetrahydronaphthalene-7-acetic acid lactone A. 1,7(and 6)Dihydroxy-5,6,7,8-tetrahydro-6(and 7)-naphthalene-acetic acid lactone A solution of 12.6 g (0.05 mole) of 6,7-epoxy-5,6,7,8-tetrahydronaphthol benzyl ether and 7.5 g (0.05 mole) of diethylmalonate in 150 ml of absolute ethanol containing about 0.01 mole of sodium ethoxide was brought to reflux for several hours. The mixture was cooled, treated with concentrated HCl and warmed to effect hydrolysis and decarboxylation. Removal of solvent left crude lactone which was purified by chromatography on silica gel.

Catalytic debenzylation over 5% Pd on C in ethanol provided the free phenol.

B. 6-Hydroxy-5(and 8)-(2-hydroxy-3-butylaminopropoxy)-5,6,7,8-tetrahydronaphthalene-7-acetic acid lactone The procedure of Example 1C and D is followed employing the above phenol to form the title compound.

EXAMPLE 18

6-Mercapto-5(and 8)-(2-hydroxy-3-tert-butylaminopropoxy)-5,6,7,8-tetrahydronaphthalene-7acetic acid thiolactone A. 7(and 6)Mercapto-1-hydroxy-5,6,7,8-tetrahydronaphthalene acetic acid lactone Employing 6,7-epithio-5,6,7,8-tetrahydronaphthol benzyl ether in place of the epoxide in Example 17 produced the title compound.

B. 6-Mercapto-5(and 8)-(2-hydroxy-3-tert-butylaminopropoxy)-5,6,7,8-tetrahydronaphthalene-7-acetic acid thiolactone The procedure of Example 4D is followed employing the above lactone to form the title compound.

EXAMPLE 19

Bis acetonide derivative of the product of Example 1

The product of Example 1 is dissolved in acetone in the presence of a catalytic amount of p-toluene sulfonic acid and the mixture is refluxed to form the title compound.

EXAMPLE 20

The Bis-butylidene derivative of 2,3-cis-1,2,3,4-tetrahydro-5-[2-hydroxy-3-(tert-butylamino)-propoxy]-2,3-naphthalenediol A. cis-5,6,7,8-Tetrahydro-1,6,7-naphthalenetriol A solution of 29.2 g. (0.2mole) of 5,8-dihydro-1-naphthol and 40 ml. of acetic anhydride in 100 ml. of pyridine is prepared. After 16 hr. the solvent is removed in vacuo and the residue dissolved in ether and washed with 200 ml. of 5% hydrochloric acid, water, 200 ml. of 10% sodium hydroxide, saturated salt solution and dried. Solvent removal gives 34.2 g. (90.5%) of crude acetate which is dissolved in 900 ml. of acetic acid and 36 ml. of water. 53.3 g. (0.32 mole) of silver acetate is added followed by 40.6 g. g. (0.16 g-atom) of iodine. The slurry is heated with good stirring at 85± 10° for 3 hr. under nitrogen, cooled and filtered. The filtrate is evaporated in vacuo and the residue dissolved in 250 ml. of methanol and cooled to 0°. A solution of 40 g. of sodium hydroxide in 200 ml. of water is added under nitrogen and the mixture stirred overnight. The bulk of the methanol is removed in vacuo whereupon a solid forms. The solid is separated by filtration, dissolved in 150 ml. of water and acidified with 20 ml. of concentrated hydrochloric acid. Cooling gives a solid which is filtered and dried to give 16.5 g. 2,3cis-5,6,7,8-tetrahydro-1,6,7-naphthalenetriol) m.p: 184.5°–187°. Three recrystallizations from absolute ethanol give the analytical sample, m.p. 188°–188.5°.

Anal. Calc'd for $C_{10}H_{12}O_3$: C, 66.65; H, 6.71
Found: C, 66.19; H, 6.68.

B. 2,3-cis-1,2,3,4-Tetrahydro-5-[2,3-(epoxy)-propoxy]-2,3-naphthalenediol

A solution of 1.20 g. (0.03 mole) of sodium methoxide and 5.4 g. (0.03 mole) of cis-5,6,7,8-tetrahydro-1,6,7--naphthalenetriol in 200 ml. of methanol is prepared under nitrogen. The residue obtained upon solvent removal is stirred overnight with 200 ml. of dimethylsulfoxide and 4.65 g. (0.05 mole) of epichlorohydrin under nitrogen. The bulk of the solvent is removed at 50° at 0.1 mm. and the residue dissolved in 100 ml. of water. Extraction with chloroform (10 × 200 ml.) gives a solid which is recrystallized from 150 ml. of hexane-ethyl acetate to give epoxy diol of the above title.

C. 2,3-cis-1,2,3,4-Tetrahydro-5-[2-hydroxy-3-(tert-butylamino)-propoxy]-2,3-naphthalenediol A mixture of 3.0 g. of 2,3-cis-1,2,3,4-tetrahydro-5-[2,3-(epoxy)-propoxy]-2,3-naphthalenediol (m.p. 104°–107°, one spot on TLC--alumina, 5% methanol in chloroform, iodine visualization) and 22 ml of t-butyl amine is heated at 85°–95° for 15 hours in a Parr bomb and the excess amine removed in vacuo. The solid obtained by trituration of the residue with ether is filtered and recrystallized from benzene to give 3.4 g, m.p. 124°–136°.

Anal. Calcd for $C_{17}H_{27}NO_4$: C, 65.99; H, 8.80; N, 4.53.
Found: C, 66.08; H, 8.88; N, 4.45.

D. Bis-butylidene derivative of 2,3-cis-1,2,3,4-tetrahydro-5-[2-hydroxy-3-(tert-butylamino)-propoxy]-2,3-naphthalenediol The product of part C is reacted with two equivalents of butaraldehyde in the presence of a catalytic amount of p-toluene sulfonic acid and the mixture is refluxed in benzene to form the title compound.

What is claimed is:

1. A compound having the structure

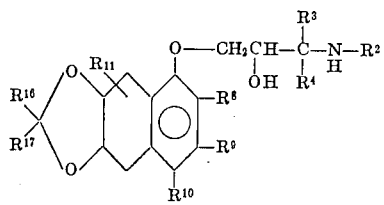

or a physiologically acceptable acid-addition salt thereof, wherein $R^2$ is lower alkyl; $R^3$ and $R^4$ are hydrogen or methyl; $R^8$, $R^9$ and $R^{10}$ are each hydrogen or a non-tertiary lower alkyl; $R^{11}$ is hydrogen, lower alkyl or phenyl-lower alkyl; $R^{16}$ and $R^{17}$ are each hydrogen or lower alkyl; and wherein lower alkyl is alkyl having up to eight carbon atoms.

2. A compound having the structure

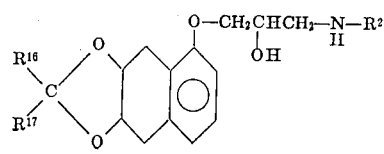

or a physiologically acceptable acid-addition salt thereof, wherein $R^2$ is lower alkyl; and $R^{16}$ and $R^{17}$ are each selected from the group consisting of hydrogen and lower alkyl; and wherein lower alkyl is alkyl having up to eight carbon atoms.

3. A compound in accordance with claim 2 wherein $R^{16}$ and $R^{17}$ are lower alkyl.

4. A compound in accordance with claim 2 wherein $R^{16}$ and $R^{17}$ are methyl.

5. A compound in accordance with claim 2 wherein $R^2$ is isopropyl.

6. A compound in accordance with claim 2 having the name 3a,9a-cis-1-(tert-butylamino)-3-[(3a,4,9,9a-tetrahydro-2,2-dimethyl-2H-naphtho[2,3-d]dioxol-5-oxy]-2-propanol.

* * * * *

UNITED STATES PATENT OFFICE
CERTIFICATE OF CORRECTION

Patent No. 3,856,818            Dated December 24, 1974

Inventor(s) Frederic P. Hauck and Christopher M. Cimarusti

It is certified that error appears in the above-identified patent and that said Letters Patent are hereby corrected as shown below:

Column 1, line 44, the word "carbon," should be: -- carbons,--.

Column 1, lines 49 to 55, that portion of formula II that reads:

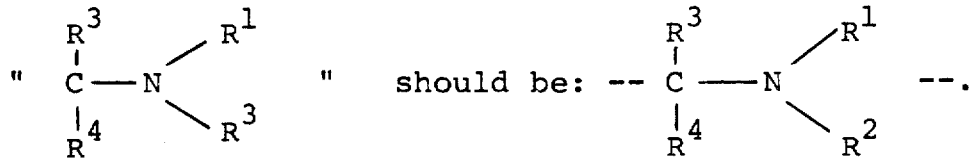

Column 1, lines 66 to 70, that portion that reads:

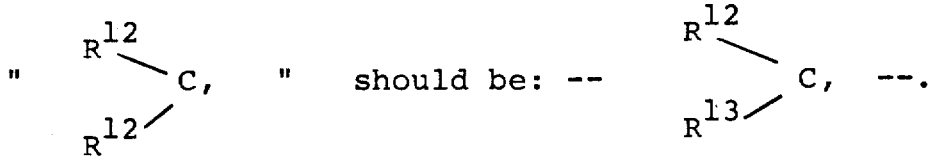

Column 4, line 44, after the word "aminopropanol" delete the letter "C" and substitute in its place: -- side --.

Column 5, line 32 should read: -- 110° for 6-12 hours. --.

Column 6, line 44, that portion reading: "$R^3$, $R_4$, " should be: -- $R^3$, $R^4$, --.

Column 7, line 31, that portion reading: " H, 6,71 " should be: -- H, 6.71 --.

Column 9, line 60, that portion reading: "122 hydrochloric acid" should be: -- 12% hydrochloric acid. --.

Column 11, line 10, insert a hyphen (-) after the 3 and before the word "oxol".

UNITED STATES PATENT OFFICE
CERTIFICATE OF CORRECTION

Patent No. 3,856,818    Dated December 24, 1974

Inventor(s) Frederic P. Hauck and Christopher M. Cimarusti

It is certified that error appears in the above-identified patent and that said Letters Patent are hereby corrected as shown below:

Column 11, line 33, insert a hyphen (-) after the word: "diethylaminomethyl".

Column 12, line 29, insert: -- B. -- at the beginning of line 29.

Column 12, line 46, the line should read: -- tetrahydro-2H-naphtho[2,3d]-1-thia-3-oxol-2-thion-   --.

Column 12, line 54, first line of the title of Example 13 should read: -- 3a,9a-trans-1(tert-Butylamino)-3[(3a,4,9,9a- --.

Column 13, line 9, first line of the title of Example 14 should read: -- 3a,9a-trans-1-(tert-Butylamino)-3[3a,4,9,9a-tetrahydro-   --.

Column 13, line 48, at the end of the line, delete "1-".

Column 14, line 55 should read: -- 7-acetic acid thiolactone  --.

Signed and sealed this 11th day of March 1975.

(SEAL)
Attest:

RUTH C. MASON
Attesting Officer

C. MARSHALL DANN
Commissioner of Patents
and Trademarks